(12) United States Patent
Wedding, Jr. et al.

(10) Patent No.: US 9,082,072 B1
(45) Date of Patent: Jul. 14, 2015

(54) METHOD FOR APPLYING USAGE BASED DATA

(76) Inventors: Donald K. Wedding, Jr., Streetsboro, OH (US); Daniel K. Wedding, Toledo, OH (US); Carol Ann Wedding, Toledo, OH (US)

( * ) Notice: Subject to any disclaimer, the term of this patent is extended or adjusted under 35 U.S.C. 154(b) by 235 days.

(21) Appl. No.: 13/549,498

(22) Filed: Jul. 15, 2012

Related U.S. Application Data

(60) Provisional application No. 61/508,024, filed on Jul. 14, 2011.

(51) Int. Cl.
*G06N 5/02* (2006.01)
*G06Q 40/00* (2012.01)
*G06Q 40/08* (2012.01)

(52) U.S. Cl.
CPC . *G06N 5/02* (2013.01); *G06Q 40/08* (2013.01)

(58) Field of Classification Search
CPC .................................. G06N 5/02; G06Q 40/08
See application file for complete search history.

(56) References Cited

U.S. PATENT DOCUMENTS

| | | | |
|---|---|---|---|
| 5,402,520 A | 3/1995 | Schnitta | |
| 5,617,513 A | 4/1997 | Schnitta | |
| 5,768,437 A | 6/1998 | Monro et al. | |
| 5,797,134 A | 8/1998 | McMillan et al. | |
| 6,064,970 A | 5/2000 | McMillan et al. | |
| 7,590,892 B2 | 9/2009 | Sohm et al. | |
| 7,865,378 B2 | 1/2011 | Gay | |
| 7,937,278 B1 | 5/2011 | Cripe et al. | |
| 8,086,523 B1 * | 12/2011 | Palmer | 705/38 |
| 8,090,598 B2 | 1/2012 | Bauer et al. | |
| 8,117,049 B2 * | 2/2012 | Berkobin et al. | 705/4 |
| 8,126,747 B2 | 2/2012 | Vadiveloo | |
| 8,131,571 B2 | 3/2012 | Vadiveloo | |
| 8,565,964 B2 * | 10/2013 | Tanoue et al. | 701/33.4 |
| 8,620,692 B2 * | 12/2013 | Collopy et al. | 705/4 |
| 2007/0213896 A1 * | 9/2007 | Fischer | 701/35 |
| 2010/0332411 A1 * | 12/2010 | Rachev et al. | 705/36 R |
| 2011/0106370 A1 * | 5/2011 | Duddle et al. | 701/33 |
| 2011/0202225 A1 * | 8/2011 | Willis et al. | 701/29 |
| 2011/0202305 A1 * | 8/2011 | Willis et al. | 702/141 |
| 2011/0213628 A1 * | 9/2011 | Peak et al. | 705/4 |
| 2012/0144219 A1 * | 6/2012 | Salahshour et al. | 713/322 |

OTHER PUBLICATIONS

Boquete et al, Data Acquisition, Analysis, and Transmission Platform for a Pay-As-You-Drive System, 2010.*

(Continued)

*Primary Examiner* — Alan Chen
*Assistant Examiner* — Mikayla Chubb
(74) *Attorney, Agent, or Firm* — Donald K. Wedding

(57) ABSTRACT

A method for measuring volatility of usage based data. Usage based data are measureable parameters of a system and parameters in which the system operates in order to infer the manner in which the system is operated. The method allows for inferences regarding the operator or operators of the system and the environment in which it operates. This invention is described with reference to consumer automobiles and drivers in typical environments, primarily for application in the automobile insurance industry where measuring volatility to determine behavior. However, this method may be applied to other systems including commercial automobiles and trucks, motorcycles, all terrain automobiles, snow mobiles, water craft, air craft, space craft, assembly line operation, robotic devices, remote operational devices, and military automobiles. This method may also be applied to applications other than assessing risk including, but not limited to, marketing, profiling, sales, optimization, operations and control.

20 Claims, 7 Drawing Sheets

(56) References Cited

OTHER PUBLICATIONS

Hultkrantz et al, Pay-As-You-Speed: An Economic Field-Experiment, 2011.*
Keogh et al, An Online Algorithm for Segmenting Time Series, 2001.*
Kim et al, Modeling of Driver's Collision Avoidance Behavior based on Piecewise Linear Model, 2004.*
Kim et al, Modeling of Human Driving Behavior Based on Piecewise Linear Model, 2005.*

* cited by examiner

METHOD FOR APPLYING USAGE BASED DATA

RELATED APPLICATION

This application claims priority under 35 U.S.C. 119(e) from U.S. Provisional Patent Application Ser. No. 61/508,024 filed Jul. 14, 2011, incorporated herein by reference.

BACKGROUND OF INVENTION

Recent advances in electronics have made possible the sensing and collection of data from various physical systems which relates to both the operation of the physical system and the conditions under which the system is being operated. This data may include, but is not limited to, how, when, and where a system is being operated. This type of data is referred to herein as usage based data. Examples of physical systems where usage based data can be collected may include, but are not limited to, automobiles, airplanes, motorcycles, boats, robots, and industrial equipment.

Systems that collect and store sensed data from physical systems have been disclosed in the prior art. For example some insurance firms have an on board diagnostics chip that resides in cars used to collect and report data.

However, to date, no satisfactory method has been put forward to link behavior to the large amount of data being collected in various physical systems. This invention herein relates to a novel method to describe behavior, using usage based data. Once behavior is quantified then it can be used for such purposes as assessing risk, marketing, safety, or predicting future behavior.

Risk as disclosed herein is defined as likelihood of an undesirable event. In the insurance industry, risk includes, but is not limited to, the probability that a vehicle will be involved in a collision with another vehicle, striking a stationary object or animal, causing personal injury, causing property damage, or being subject to theft or vandalism. Assessing risk is of interest to insurers. Previously insures assessed risk based on parameters including age, sex, and past record of accidents. It has been recognized that data collected directly from automobiles (or other physical systems) may be used to more accurately determine risk. Risk in the medical industry includes, bit is not limited to, the probability that a patient will recover, develop an infection, or have an adverse reaction to a medication. The ability to assess risk is universal across all industries.

This invention proposes quantifying behavior to usage based data collected from various physical systems. In the case of an automobile the usage based data may include, but is not limited to, such things as speed, acceleration, time of day, weather conditions, and turns. Thus by quantifying behavior of an automotive system, risk of accident can be assessed. In the case of a medical industry the usage based data may include, but is not limited to, such things as patent age, patient weight, if the patient is a smoker, family medical history, and other diseases the patient may already have. Thus by quantifying behavior of a patient system, the risk of a medical procedure can be assessed.

Although described with reference to automobiles with the insurance industry and patients in the medical field, this invention may be applied to any physical system.

An example of automobile usage based data and an insurance company using described behavior to assess risk to determining insurance rates, is used for illustrative purposes herein. This example is used for clarification for the purpose only and should not be construed to limit the scope of this patent. It is contemplated that these methods can and will be used in other industries and should not be considered limited to the auto insurance industry.

System operational data is collected at discrete intervals. The data collected relates to the operation of the system. For example, assume the system is an automobile. In this case, data may be collected every few seconds related to the time and date of operation, the speed of the automobile, and the location of the automobile.

New electronic methods allow the collection and storage of vast amounts of data. This data collection process results in large quantities of data that need to be assessed in order for it to be useful. A snapshot is defined as the conditions of operation at a given point in time. These may include, but are not limited to, time, date, location, altitude, and speed. In the example of the automobile, the snapshots of the automobile operation need to be analyzed so that operational behavior can be quantified. This information can be used by an automobile insurer can determine if the automobile is being operated in a safe manner or a risky manner.

PRIOR ART

Data Collection

Usage based data is collected from an automobile, robot, or machine at different times during its operation. The data may include such information as vehicle identification number, time stamp, date stamp, and position (for example latitude and/or longitude). This data may include, but is not limited to, "telematics data". Telematics data is defined as data that combines telecommunication devices and informatics. Telecommunication devices are defined as any device that transmits data over a distance such as radio, telephone, or computer network. Informatics is defined as the use of computers to store, retrieve, and transmit data. An example of telematics usage based data would be, but would not be limited to, data collected from a collection device being placed inside of an automobile's on board diagnostics (OBD) port. Singularly and collectively this collected data is called usage based data. Usage based data may be referred to telematics data.

From this data, it is possible to derive information related to the operation of the automobile. This information includes, but is not limited to, geographical area of operation, speed, change in lateral position (for example, left or right turns), altitude, and distance traveled.

It is possible the information may also be collected directly, and it may not be necessary to derive it from the raw data. The following prior art describes methods of data collection and are incorporated herein by reference.

U.S. Pat. No. 8,131,571 (Vadiveloo) discloses placing insurance risk into mutually exclusive and collectively exhaustive subsets for risk analysis.

U.S. Pat. No. 8,126,747 (Vadiveloo) discloses placing insurance risk into mutually exclusive and collectively exhaustive subsets for risk analysis.

U.S. Pat. No. 8,090,598 (Baquer et al.) discloses a means of collecting data from vehicle use in order to assess insurance price.

U.S. Pat. No. 7,937,278 (Cripe et al.) discloses a method for calculating and applying insurance costs based upon miles driven.

U.S. Pat. No. 7,590,892 (Sohm et al.) discloses a method for using computer readable media to collect and download data.

U.S. Pat. No. 7,865,378 (Gay) discloses a method for pricing insurance risk on a per mile basis.

U.S. Pat. No. 6,868,386 (Henderson et al.) discloses a means of collecting data from vehicle use in order to assess insurance price.

U.S. Pat. No. 6,064,970 (McMillan et al.) discloses a means of collecting data from vehicle use in order to assess insurance price.

U.S. Pat. No. 5,797,134 (McMillan et al.) discloses a means of collecting data from vehicle use in order to assess insurance price.

U.S. Pat. No. 5,768,437 (Monro et al.) discloses using fractal transformations for the purpose of determining the proper domain of the data.

Vast amounts of data have been analyzed in the finance industry. The following prior art describes the measurement of stock market volatility and are incorporated herein by reference.

U.S. Pat. No. 5,617,513 (Schnitta) discloses analysis of a signal by passing it through a noise filter and flagging deviation from a known signal.

U.S. Pat. No. 5,402,520 (Schnitta) discloses retrieving a signal from a signal containing noise.

PRIOR ART

Operational Behavior and Behavioral Score

The operational behavior of a system is defined as the usage of a system which might be different from one user to another, one application to another, one condition to another, or one situation to another. For example, a case of operational behavior being different from one user to another would be two drivers of the same car. Assume that the first person drives the car at a constant speed of 50 Miles per hour. Then assume that the second person drives the same car by speeding up to 75 Miles per hour and then slowing down to 25 Miles per hour. The usage of the car by each of the drivers is the operational behavior.

Operational behavior can be described by means of a behavioral score. A behavioral score is defined as one or more numerical or categorical values that can be used to classify or describe operational behavior. For the previous example, a score for the two drivers might be a numeric value. Hypothetically, it could be a value of 100 (or some other value) for the first driver and 150 (or some other value) for the second driver. Or it could also be a categorical value such as "category A" (or some other value) for the first driver and "category B" (or some other value) for the second driver. Whatever measure is used, the operational behavior is used to separate different types of behavior for use in decision making.

Currently, operational behavior and behavioral scores in automobile insurance are determined by simple means such as adding up total miles driven, calculating sudden starts and sudden stops, counting the amount of times a driver goes past a certain speed limit, or counting the amount of times that a driver operates a vehicle at a time that is considered dangerous. More sophisticated means will be described in this document.

DETAILED DESCRIPTION OF THE DRAWINGS

Prior Art Analysis of Analyzing Consumer Automobile Driving Data

Figure 1:
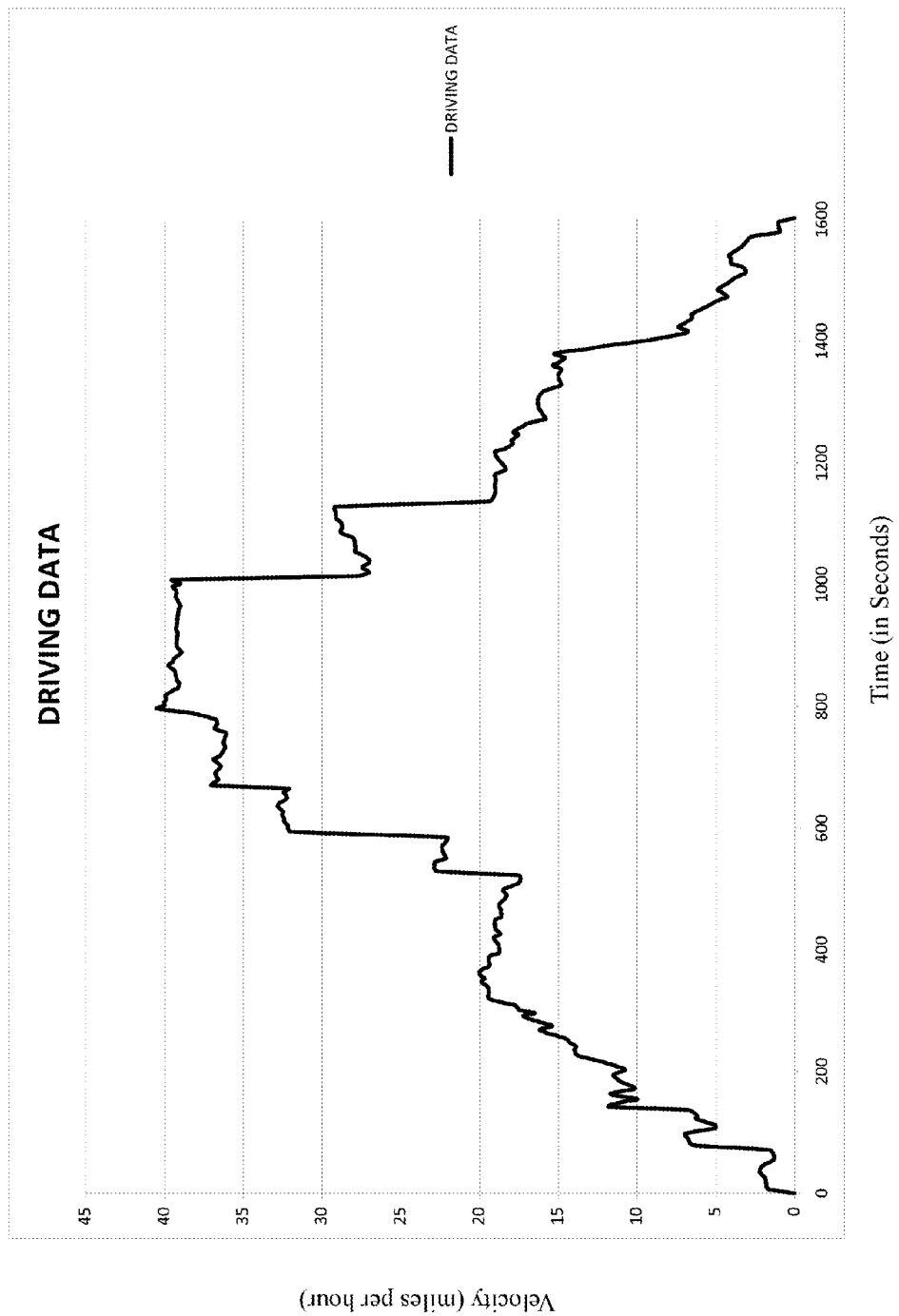
FIG. 1 is a chart or graph of raw driving data of a hypothetical automobile: X-Axis=Time (in Seconds), Y-Axis=Velocity (in Miles Per Hour).

The chart in FIG. 1 depicts a hypothetical automobile trip where an automobile drives at different speeds (Y-AXIS=Miles per Hour) for 1600 seconds, approximately 27 minutes, (X-AXIS=elapsed Time in Seconds). From the figure, it is seen that the automobile travels at different speeds throughout the trip.

The data in FIG. 1 is analyzed by converting it into a continuous X-Y plot. The X-Y value can be any combination of variables collected. For example, the X coordinate might be the number of seconds that have elapsed since an automobile was started. The Y value may be the average speed of operation at the time the data is collected. As illustrated, X-Axis=Seconds, and Y-Axis=Miles Per Hour.

$$LineLength_{1,2} = \sqrt{(x_1 - x_2)^2 + (y_1 - y_2)^2} \quad \text{(Equation 1)}$$

It is possible to measure the line length of a line segment by applying the Euclidean distance formula given in Equation 1. Prior to applying the distance formula of Equation 1, the data must be organized into line segments. Organizing the data is defined as converting or formatting the data into one or more line segments by methods including, but not limited to, sorting data, merging data, averaging data, imputing data, or possibly doing nothing to the data. A line segment is defined as a line that links two points. For usage based data, it is typical to calculate the lengths of line segments that are formed by connecting points that are adjacent on the X-AXIS. For example, assume that data collected from a usage based data device had three measurements as shown in Table I:

TABLE I

| X (time) | Y (speed) |
|---|---|
| 10 seconds | 50 MPH |
| 20 seconds | 75 MPH |
| 30 seconds | 25 MPH |

These three points would yield two line segments. The first line segment is the line that is formed from joining the points (10, 50) to (20, 75). The second line is formed by joining the points (20, 75) to (30, 25).

The problem with using Equation 1 is that it treats all line segment lengths in the same way whereas that may not necessarily be the case. For example, assume an insurance company wanted to assess driving risk based upon usage based data that was collected from an automobile. Using Equation 1, the insurance company would arrive at the same value for an automobile that accelerates from 0 Miles per Hour (MPH) to 20 MPH in 10 seconds as with an automobile that accelerates from 80 MPH to 100 MPH in 10 seconds. Clearly a car accelerating to 20 MPH would have a different behavioral score than a car travelling at 100 MPH, yet Equation 1 does not address this. Both of the line segment lengths in this case would be identical using Equation 1.

A new method for calculating line length is presented herein which will allow adjusting line lengths based upon other parameters (such as initial and final speed). From the line segment lengths calculated in Equation 1, it is possible to measure the entire line length of Equation 1 by summing the "n" line segment lengths using the formula given in $$\text{Total\_Line\_Length}_{1,n} = \sum_{i=1}^{n} \text{Line\_Length}_{i,i+1} \qquad \text{(Equation 2)}$$

Equation 2 has deficiencies similar to Equation 1 in that it treats each line segment as equal when it is summing them. Again this may not be valid for certain applications. For example, in the insurance example an automobile that accelerates from 0 MPH to 65 MPH in 20 seconds might be perfectly safe in some cases yet risky in others. In a case where a car is at a red light at an on ramp to an expressway, the 0 MPH to 65 MPH would be perfectly reasonable. Yet, if the same car were stopped on an expressway due to a traffic jam, the acceleration would be considered highly risky because it would suggest that the car is driving in a dangerous traffic condition which is more likely to result in an accident and an insurance claim. Equation 2 does not account for this and will treat the safe and dangerous accelerations as the same. A new method for calculating total line length is presented herein that allows adjusting line lengths based upon other conditions such as where and when a car is driving.

The amount of variation or driving volatility in this line can be measured by comparing the usage based data to target data. Target data is defined as that data can be used as an ideal model for a given set of circumstances. Target data can be used to describe target behavior The case where the vehicle covers the same distance in the exact same amount of time, but travelling at a constant velocity also known as a single average value. In this example, constant velocity can be considered a target behavior. A target line is defined as the graphical line representation of target behavior. A target line segment is defined as a line segment that makes up a target line.

For example, the hypothetical vehicle in FIG. 1 would be able to cover the exact same distance at the exact same amount of time if it were to travel approximately 21 miles per hour.

When the length of the SOLID LINE (hypothetical driving data) is measured using Equation 1 and Equation 2 then it is found to be approximately 132 (if the time is converted to hours) and approximately 476,456 if the time units are kept in seconds. The length of the DASHED LINE (single average value) is measured to be approximately 0.5 if the units are converted to hours and approximately 1600 if the time units are in seconds.

Estimating the variability of the driving speed can be accomplished many different ways. Two of these basic techniques are shown here. The first would be SUBTRACTING the length of the DASHED LINE (single average value) from the SOLID LINE (actual). The result of this, using the HOUR CONVERSION would be 132−0.5=131.5

A second approach would be to measure the variation or volatility by applying a ratio of the actual driving (SOLID LINE) to the average line (DASHED LINE) which would be 132/0.5=264.

Figure 2:
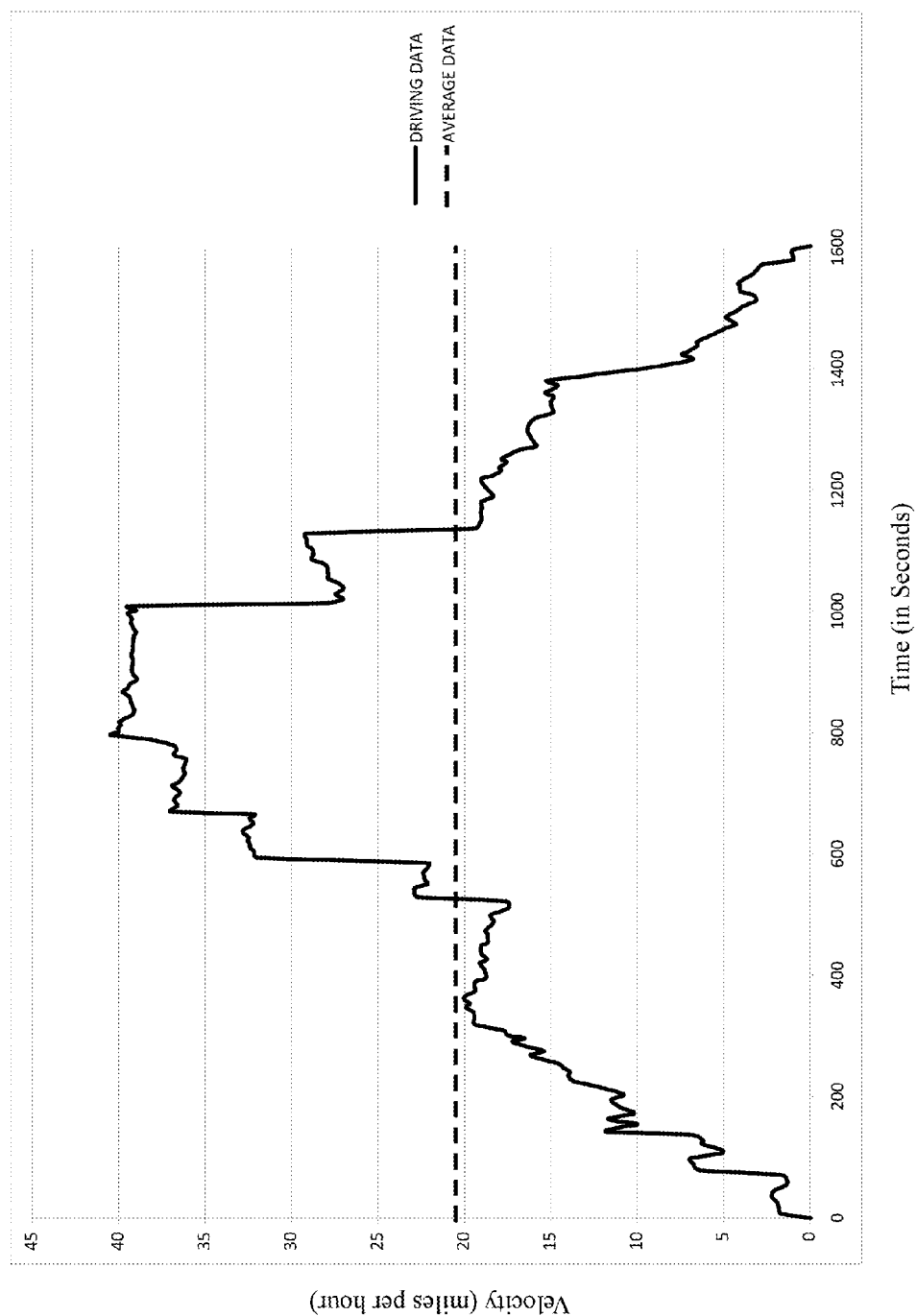
FIG. 2 is a chart or graph of raw driving data of a hypothetical automobile: X-Axis=Time (in Seconds), Y-Axis=Velocity (in Miles Per Hour) with average velocity X-Axis=Time (in Seconds), Y-Axis=Velocity (in Miles Per Hour).

FIG. 2 Driving Data and Constant Speed Driving Data: X-Axis=Seconds, Y-Axis=Miles Per Hour. The technique is applied for changes in speed so that behavior can be described for determining insurance rates. It is assumed that a driver who frequently changes speed will have a different risk level than a driver that drives at a constant speed.

Risk is assessed by adding up all of the differences or ratios and then assessing the cost of that risk so that price may be determined.

The problem with this technique is that it is comparing a driver's behavior to an artificial behavior (single average value) that can never occur. In this case the car mysteriously goes from a dead stop to the average speed and then mysteriously stops when it reaches its destination with no gradual acceleration or deceleration. Not only is the driver being measured against an impossible standard, but there is no evidence to suggest that this is actually safer than the driver's true behavior where the driver must obey speed limits and traffic signals. In this document, a new technique is presented for describing behavior against other target behaviors other than an average value.

Method Using Generalized Line Length for Analyzing Usage Based Data

Metric is defined as a numeric value or values that quantifies or describes one or more properties. The following method is described in the context of consumer automobiles usage based data for the purpose of quantifying and describing behavior. But it can also be applied to other systems including commercial automobiles and trucks, motorcycles, all terrain vehicles, snow mobiles, water craft, air craft, space craft, assembly line operation, robotic devices, remote operational devices, surgical procedures, patient recovery rates, consumer trends, market profiling, and any other system where collected data can be used to describe the behavior of the system. The described behavior can be used to mitigate risk, assign rates, allocate resources, or predict future behavior.

The distance metric for determining operational line length is typically measured using the Euclidean distance given in Equation 1. The method proposed herein improves upon the prior art by applying a more generalized formula, herein referred to as generalized line length, which is given in Equation 3 below. As previously stated, Equation 1 is unable to differentiate between a car safely accelerating from 0 MPH to 20 MPH and a car accelerating from 80 MPH to 100 MPH. Clearly the second car behaves differently when compared to the first car. The proposed method given allows for adjusting the value based upon criteria such as final speed. This is an improvement on classifying and describing driving behavior.

$$\text{Generalized\_Length}_{1,2} = \sqrt[p]{a(b_1((f_1(x_1) - f_2(x_2)))^{n1} + b_2((g_1(y_1) - g_2(y_2)))^{n2})} \qquad \text{(Equation 3)}$$

In Equation 3, the values $f_1(x)$, $f_2(x)$, $g_1(y)$, and $g_2(y)$ are all functional transforms of the X and Y variables that are completed prior to raising them to some power. The transforms can be (but are not limited to) something simple such as multiplying by a constant to something more complex such as taking a log transform. The values $b_1(x)$ and $b_2(y)$ are also functional transforms that are completed after the difference is calculated between X and Y. The process of applying a functional transform to obtain a desired or necessary result is also known as using a beneficial transform. The values $n_1$ and $n_2$ are exponents that raise the resulting operations to a specific power. They may take on any mathematically valid value. The value $a(x)$ is a functional transform of the entire value inside of the root term. Finally, the value of p is a root value of summation under the root term. It may also take on any mathematically valid value.

Notice that the Euclidean distance in Equation 1 is a special case of the more generalized distance formula in Equation 3 if the parameters of Equation 3 are set as follows:

| | |
|---|---|
| $f_1(x), f_2(x), g_1(y),$ and $g_2(y)$ | All of these functions are set to "multiply by 1" |
| $b_1(x)$ and $b_2(y)$ | Both of these functions are set to "multiply by 1" |
| $n_1$ and $n_2$ | Both of these functions are set to 2 |
| $a(x)$ | This functions is set to "multiply by 1" |
| p | This function is set to 2 (thus taking the square root) |

Method for Extending the Line Length Metric to Dimensions Other than Two Dimensions for Analyzing Usage Based Data In the previous section, the formulas applied use only two dimensions (X and Y). However, this can easily be extended to multiple dimensions for example, but not limited to, (X,Y, Z) or (W,X,Y,Z). In the case of the automobile, other dimensions that can be included in the distance formula may include:
  Time (such as time of day, day of week, month, etc.)
  Lateral movement (left and right)
  Vertical movement (up and down)
  Weather conditions
  Geographic position This is an improvement over current techniques because it allows for adjusting the behavioral scores based upon other information as opposed to using the raw data. As an example, consider again the auto insurance company. Assume that two identical cars make identical driving trips with exactly the same data of starting and stopping and speeding up and slowing down. Using the conventional approaches, both cars would be rated as having the same risk. However, it is proposed that other information be used for adjusting the score. For example, assume that the first car in the previous example was driving in a small rural town in the south where there is no traffic and good weather. Assume that the second car was driving in a crowded city in the Midwest during the winter months. Clearly crowded traffic and slippery roads would make the trip more risky to insure than the first trip. This generalized line length method proposed herein allows for incorporating other data into the calculation.

Method for Using Slope for Analyzing Usage Based Data

In the previous section, the usage based data was analyzed by calculating the generalized line lengths. This can also be extended to other measurements such as the slopes of the generalized line lengths, herein referred to as generalized line slopes.

The difference of using generalized line slopes as opposed to general line length is that sudden changes in the values of usage based data and these will generate large slopes. Slope is defined as a quantity which gives the inclination of a curve or a line. A steep slope upward or downward, for example, can be used as a method of classifying sudden breaking events or sudden acceleration and can be used for, but not limited to, ascertaining driving risk.

Consider two cars that travel identical trips with the following exception. The first car accelerates suddenly but gently glides to a stop. The second car accelerates slowly but slams on the breaks when stopping. In this case, the line length would be the same and the fractal dimension would be the same. Yet one car has a sudden acceleration and the other has a sudden stop. Using slope allows for differentiating between the two. For an insurance company, it is known that there is different risk associated with sudden acceleration and sudden stops. The insurance company would then be able to price accordingly.

Method for Using Area Under the Curve Metrics to Analyze Usage Based Data

In the previous section, the usage based data was analyzed by calculating the generalized line lengths and/or the generalized line slopes. This can also be extended to other measurements such as area.

The difference of using generalized line area as opposed to generalized line length or generalized line slope is that area catch long term trends missed by the previous two methods. For example, a driver who is constantly speeding 15 miles per hour over the speed limit would not have sudden increases and decreases and thus the generalized line slope would miss the fact the driver is speeding. The generalized line length would also yield a behavior value close to a line generated from target data. The previous methods might miss a speeding driver as a potential risk. In the case of the area, the area under the usage based data (the speeding driver's data) would show a large area indicating a constant and habitual behavior pattern that may be considered risky.

Method for Using Fractional Dimension "Fractal" Metrics to Analyze Usage Based Data With the advancement in chaos theory over the past 50 years, methods have been devised to calculate the fractional dimension ("fractal dimension") of lines. Fractional dimension is defined as a ratio providing a statistical index of complexity comparing how detail in a pattern changes with the scale at which it is measured. Typically, most fractal dimensions techniques yield higher values for lines with a significant amount of variation or volatility while straight lines tend to have lower fractal dimensions. This will not necessarily always be the case as some approaches yield results that do not follow this pattern. As there are many techniques for this calculation, they cannot be listed in this document. However, some widely used techniques include:
  Higuchi's Algorithm
  Hurst Exponent Method
  Petrosian Algorithm
  Katz's Algorithm
  Box Counting Method Calculating the fractal dimension of a line such as the one presented in FIG. 1 allows for assigning a numeric value to the variations or volatility in the speed. Many sudden accelerations and stops will result in a different fractal dimension than a flat line that occurs from constant speed. Therefore, even if two driving data sets have the same total lengths, they would have significantly different fractal dimensions. This is will improve the ability to assess and classify the driving behavior of each operator.

Method for Using Signal Analysis Techniques for Analyzing Usage Based Data

Operational behavior can also be classified using signal analysis techniques of the lines given above. Signal analysis techniques are defined as techniques that analyze a signal in the time and frequency domains. These techniques include, but are not limited to, convolution, Fourier transforms, and harmonic analysis.

Method for Using a Generalized Metric for Total Line Measurement for Analyzing Usage Based Data As mentioned before, the method for determining the total line length metric is calculated using the formula given in Equation 2 where all of the line segments are added together. A new method is proposed that will improve upon the prior art by applying a more generalized formula which is given in Equation 4. Recall that the problem with the prior art given in Equation 2 is that it is unable to differentiate between a safe usage such as accelerating onto an expressway and an unsafe condition such as stops and starts that occur on an expressway during a traffic jam.

$$GeneralizedTotalMeasurement_{1,n} = a\left(\sum_{i=j}^{m} f_i(Measurement_{i,i+k})\right) \quad \text{(Equation 4)}$$

Equation 4 does permit this type of weighting. It is also more general in that it allows for employing metrics other than line length such as fractal dimension and slope. Weighting is defined is the application of a formula to increase or decrease the effect of a value prior to combining or comparing it with other values. This may include, but is not limited to, multiplying by a constant, binning, taking a log transform, or doing nothing to the value. Weighting is also called "preferential weighting".

In Equation 4, the summation of n line measurements runs from "j to m" instead of "1 to n". The value j is the starting value and it may be any value from 1 (the actual starting point) to some other starting point other than 1. The value m is the ending value and it may be any value from n (the actual ending point) to some other ending point other than n. The value of $f_i(x)$ is a functional transform for the line measurement. It can be any transform including, but not limited to:
  Multiplying by a value of 1 (which is the same as Equation 2)
  Multiplying by a value other than 1 (giving the line length more or less weight)
  Multiplying by 0 (which ignores the line length)
  Taking a transform such as log transform
  A business rule transform
  Any other transform of the number.

Notice that the $f_i(x)$ has a subscript which indicates that the functional transform does not need to be the same for all line measurements. Also, the value of k indicates that the distances measured in Equation 3 and used in Equation 4 do not necessarily need to be adjacent. Furthermore, the measurement does not necessarily need to be line length. As stated above the measurement could also be the fractional "fractal" dimension or some other type of metric such as slope that can be applied to this type of data Finally, the value of a(x) is a functional transform for the total length. It can also be any transform similar to, but not necessarily the same as, the $f_i(x)$ transform.

Notice that the previously mentioned Equation 2 is a special case of the new generalized transform given in Equation 4 with the parameters set to:
  j=1
  m=n
  k=1
  Measurement is distance
  $f_i(x)$=multiply by 1 for all line lengths
  a(x)=multiply by 1

Method for Analyzing Usage Based Data by Comparison to Data Sets Comprised of Values Other than a Single Average Value As mentioned above and depicted in FIG. 2, the driving data is compared to an average speed in order to assess risk. But it is not necessary to only compare behavior to a constant average speed. As previously stated, this average value is impossible to achieve and is not known to even be an optimal behavior. Therefore using a fixed average as target data to describe behavior may result in poor results.

A new method is proposed where the usage based data is compared to other data as opposed to a single straight line representing an average value. This method allows for comparison to data such as usage patterns considered to be safer or more profitable. Therefore, the usage based data can be measured against that of a different target behavior.

Figure 4:
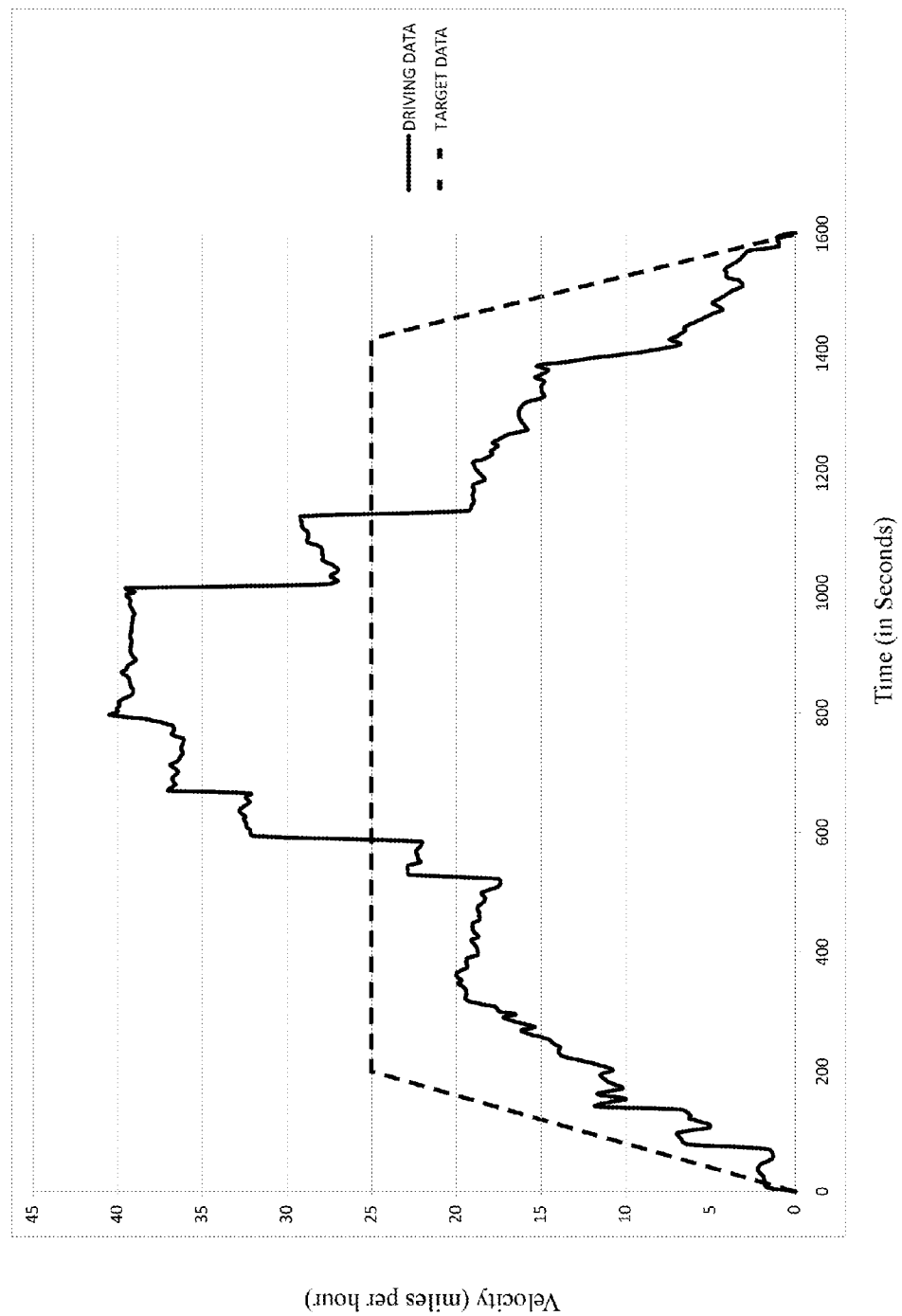
FIG. 4 is a chart of driving data of a hypothetical automobile and target driving data.

In FIG. 4, the target data set is a quick ramp up, steady speed, and ramp down to a stop. Thus, the target data or target behavior does not need to be a single straight line based upon an average speed. Instead, the target can include, but is not limited to:
  A target based upon generally accepted industry or business beliefs optimizing profit, cost, revenue, safety, or some other metric.
  A target based upon a government regulation.
  A target based upon the behavior of a different operator or aggregate of more than one operator.
  A target based upon artificially generated data, including randomly created data.
  A target based upon a worst case scenario in order to measure improvement.

Method for Measuring Usage Based Data Versus a Target Data Set

Two simple methods for calculating the difference between the actual behavior and a target behavior (such as the average) is to compute the line lengths of both lines and then either subtracting one from the other or else calculating the ratio. A more generalized approach is given in Equation 5, Equation 6, and Equation 7. Each will be explained below.

$$\text{Comparison\_Actual\_to\_Target}_1 = a(f(\text{Measure}_{actual})\text{-}g(\text{Measure}_{Target})) \quad \text{(Equation 5)}$$

The method proposed herein improves upon the prior art by applying a more generalized formula, herein referred to as generalized difference which is given in Equation 5. Equation 5 is a more generalized method for taking a difference value between the two measurements of the lines. This method applies a functional transform $f(x)$ to the actual line measurement and a second (and possibly different) functional transform $g(x)$ to the target line measurement before computing the difference. In this case, it is possible that $g(x)$ can be set to zero which eliminates a comparison with a target and uses the actual behavior in a raw form. A third functional transform $a(x)$ is applied to the difference. The functions that may be applied may include, but are not limited to, log transform, multiplication, or some business rules. The measurements used in the functions may include, but are not limited to, line length, area, or fractional dimension (i.e. fractal dimension).

The previously described approach is a special case of this technique with the three functions, $f(x)$, $g(x)$, and $a(x)$ being set to a function of "multiply by 1". The measurement of the lines described above is the "line length".

$$\text{Comparison\_Actual\_to\_Target}_2 = a\left(\frac{f(Measure_{Actual})}{g(Measure_{Target})}\right) \quad \text{(Equation 6)}$$

The method proposed herein improves upon the prior art by applying a more generalized formula, herein referred to as generalized ratio which is given in Equation 6.

Equation 6 is a more generalized approach to taking a ratio value between the two line measurements. This method applies a functional transform $f(x)$ to the actual line measurements and a second (and possibly different) functional transform $g(x)$ to the target line measurements before computing the ratio. A third functional transform $a(x)$ is applied to the ratio. The functions that may be applied may include, but are not limited to, log transform, multiplication, or some business rules. The measurements used in the functions may include, but are not limited to, line length, area, or fractional dimension (i.e. fractal dimension).

The previously described approach is a special case of this technique with the three functions, $f(x)$, $g(x)$, and $a(x)$ being set to a function of "multiply by 1". The measurement of the lines described above is the "line length".

$$\text{Comparison\_Actual\_to\_Target}_3 = a\left(\sum_{i=1}^{n}\sum_{j=1}^{m} f_{ij}(x_i y_j)\right) \quad \text{(Equation 7)}$$

Equation 7 is a comparison approach that does not compute line length. Instead, it takes the n points from the actual data, and m points from the target data. A function is applied to the two points such as, but is not limited to, convolution, cross correlation, or area. Notice that the function $f_{ij}$ allows for a unique function to be applied to each line segment.

The reason that this is an improvement over the prior art is that the prior art assumes that the prior art uses a simple subtraction or division of total line length versus a fictitious target profile. In this case, the comparison is expanded to permit functional transformation prior to comparison (Equation 5 and Equation 6). These transformations can permit comparisons that may not be possible using the prior art. For example, a trip might take more or less time than is believed optimal. The transformations allow for the analyst to adjust both driving records to the same scale prior to comparing. This will allow for comparing the driving profiles of different drivers to each other to determine which one exhibits desirable driving behavior. Equation 7 expands the analysis to permit new driving scores that would not arise from employing only line length, fractal, or slope calculations. Here it is possible to calculate other metrics using techniques, such as convolution, that do not make use of line length, fractal, or slope. This expansion into new metrics allows for more accurate profiling of driver behavior because it allows for new scores to be used in conjunction with the standard scores.

Method for Using Area Under the Curve Versus Target Data to Describe Behavior

Figure 3:
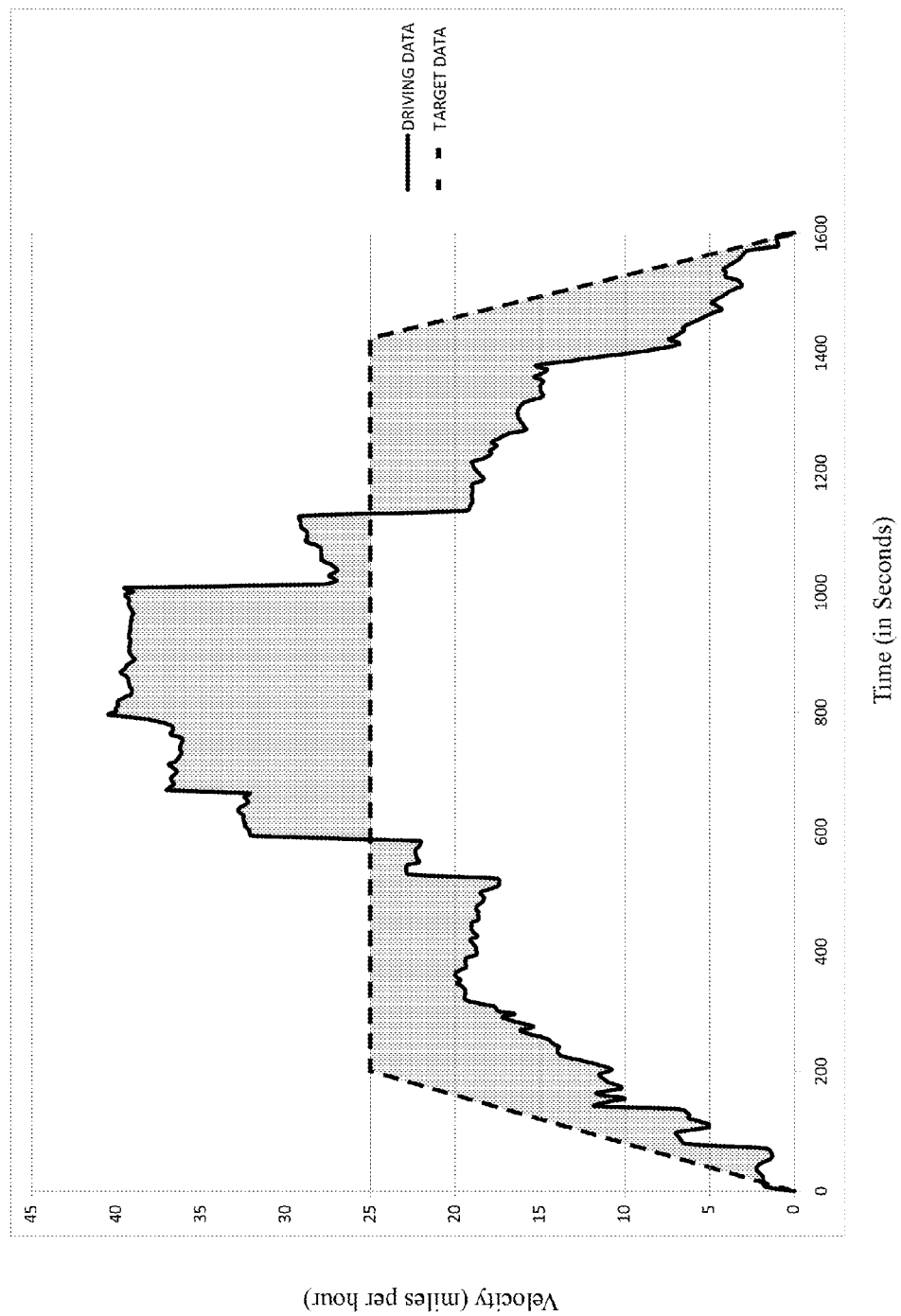
FIG. 3 is a chart or graph of the area under the curve between the driving data of a hypothetical automobile and the target driving data.

Usage based data can be analyzed by calculating the line length of the data. This can also be extended to area. In other words, the area between the usage based line segments data and a target curve as seen in FIG. 3.

The difference of using area as opposed to line length is that area will treat differently any sudden increases and decreases in the values of usage based data. For example, sudden increases and decreases would show volatile driving and may lead to the conclusion that the driver is a higher risk to insure. However a driver who is constantly speeding 15 miles per hour over the speed limit would not have sudden increases and decreases. The previous method might miss a speeding driver as a potential risk. In this case, the area under the usage based data (the speeding driver's data) and the target curve (the actual speed limit) would show a large area indicating a constant and habitual behavior pattern.

Method for Determining Total Operations Behavior from Usage Based Data

Total operational behavior is calculated by comparing specific time intervals of data and comparing it to a target. These are then added for all the time intervals. For the purpose of an automobile, a driver is observed changing speeds frequently and compared to a straight line where no change exists. Total driver behavior is then calculated and a risk can be assigned. A more generalized approach is presented here in Equation 8.

$$BehaviorScore = a\left(\sum_{i=1}^{n} f_1(\text{Comparison\_to\_Target\_Value}_i)\right) \quad \text{(Equation 8)}$$

As opposed to adding up all of the known data, this approach proposes using a subset of data over a specific time period. Therefore, the value n could be a value representing all known values, or it could be a smaller value from a smaller time period.

The $f_i(x)$ value is a function that can increase or reduce the importance of the value being summed. For example, data collected at a particular time of day, particular time in the year, particular speed band, or geographical location may be weighted higher or lower than others. The Comparison to Target Value argument given in the function represents the values derived from a specific period of time and may be derived, but is not limited to, the techniques used in Equation 5, Equation 6, and Equation 7. The $a(x)$ value is a function value that can increase or reduce the final result based upon such factors including, but not limited to, time of day, particular time in the year, particular speed band, or geographical location may be weighted higher or lower than others. Notice that the previously mentioned approach is a special case of Equation 8 where the $f(x)$ and $a(x)$ functions are set to "multiply by 1".

The reason that this is an improvement over the traditional approach is that it allows a behavior score to be determined by weighting different types of driving trips. For example, driving during rush hour might be weighted differently than driving at times when there is not much traffic. Even though two drivers have the exact same profile and scores, the fact that one is driving in dangerous conditions can be used to assign a higher risk than the driver that drives at safe times and safe conditions.

Method for Using New Usage Based Features Other than Speed and Time to Measure Operational Behavior with Usage Based Data The following method is described in the context of consumer automobiles usage based data for the purpose of assessing driving risk. But it can also be applied to other systems including commercial automobiles and trucks, motorcycles, all terrain vehicles, snow mobiles, water craft, air craft, space craft, assembly line operation, robotic devices, and remote operational devices. This method may also be applied to applications other than assessing and pricing risk including, but not limited to, marketing, profiling, up selling and cross selling, and optimization.

All of the new and novel techniques above have been applied to the example of speed versus time. This is because in the auto insurance industry this is what is of primary interest. However, it is possible to measure other features and these can also be measured and qualified using the techniques above. It is proposed that it is new and novel to apply the techniques above also to the following:
 Lateral Movement versus time
 Lateral Movement versus distance traveled
 Lateral Movement versus speed
 Left and right turns versus time
 Left and right terns versus distance traveled
 Left and right terns versus speed
 Position versus time
 Position versus distance traveled
 Position versus speed
 Yaw, pitch, and roll rotations versus speed
 Any combination of 3 or more variables of lateral movement, left or right turns, vertical position, distance travelled, and speed The reason that this is an improvement is that prior analysis focused on speed. Yet other metrics are available and are useful in describing driving behavior. For example, assume that two cars travel at the same speed for the same distance. The first car stays in the same lane while the second car weaves in and out of traffic. Calculating lateral movement during operation will allow for determining which car is being operated in an unsafe manner. Likewise, frequent left turns into busy traffic may carry different risk than a car that does not turn into busy traffic. Utilizing that information will also improve the ability to profile the behavior of the vehicle operator.

Method for Combination Scores to Determine Usage Based Behavior

New techniques have been proposed herein to measure many different types of data in novel and unique ways. It is proposed that data collected be analyzed in multiple approaches (such as generalized line length, line slope, area under the generalized line segment, and comparison to target data) and then combine the different scores to describe behavior. The techniques for combining these metrics may include, but are not limited to:
 Hard Clustering
 Fuzzy Clustering
 Self Organizing Maps (Kohonen Neural Networks)
 Memory Based Reasoning
 Business Rules The reason that this is in improvement is that it permits combining many different scores (as opposed to one score) such as lateral movement, speed, turns, etc. into a behavioral score or scores that will describe the driving behavior of an operator.

Method for Weighting Usage Based Values Based Upon Specific Criteria

The above methods that are proposed permit different weights to be applied to data. It is proposed that different weights be applied to the measurements based upon secondary factors that can be ascertained from the measurements. These proposed and novel metrics are:
 Time of day
 Date of operation
 Day of week
 Weather condition
 Geographic location
 Country of operation
 Speed band
 Fractional dimension of line
 Slope of line The reason that this improves the current method is that it makes use of variables and information that have previously been unused during the assignment of a behavioral score.

Method for Applying the Above Reference Usage Based Data to Other Systems

The type of analysis described in this document has been applied to consumer automobile data to ascertain operational risk. It is proposed and is new and novel that this analysis can be applied to:
 Commercial automobiles and trucks
 Motorcycles
 All Terrain Vehicles
 Snow mobiles
 Water craft
 Air craft
 Space craft
 Assembly line operation
 Robotic devices
 Remote operational machines Method for Applying Usage Based Data to Other Applications This data has been used for risk assessment for insurance pricing. It is new and novel to apply these same metrics to other applications such as:
 Hiring the appropriate personnel such as a transportation company hiring the safest drivers
 Marketing to the correct customer
 Optimizing use of vehicles and placement of operation centers
 Cross Sell and Up Sell
 Operations and control
 Emergency Detection
 Forensic Analysis
 Prediction of future behavior The reason that this is an improvement is that usage based data has focused upon driving risk. However, the techniques that are described in this document can be applied to other areas. For example, certain driving behavioral scores can be found to be more profitable than others. So a company can recruit drivers with that profile or terminate drivers with undesirable behavior profile. Thus, the analysis can be used for hiring, firing, or other personnel decisions. Also, the profile can be used to identify which employees need training or additional education in order to modify their behavior profile. Likewise, a car with many hard stopping events might need breaks or tires sooner. A company could send coupons to customers that are more likely to need these products. Additionally, drivers who drive in dangerous conditions can be encouraged to purchase additional safety features for their vehicles. In a more immediate time frame, the techniques described above can be used to detect certain dangerous operational conditions such as the driver falling asleep while driving or else a profile might be useful to determine whether an emergency condition is occurring such as a car swerving out of control so safety devices would be engaged.

Figure 5:
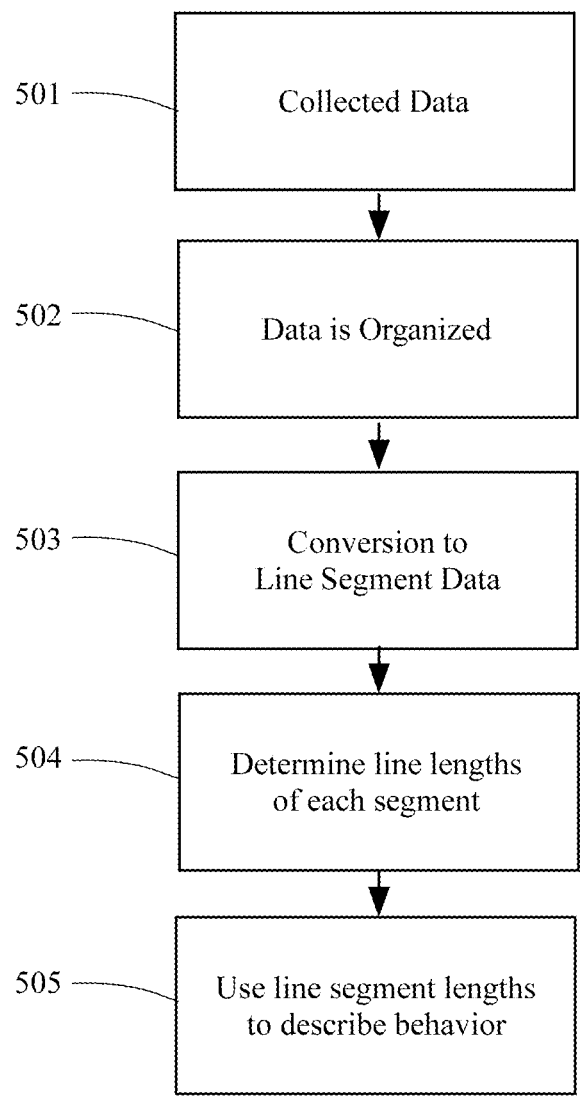
FIG. 5 is a block diagram of data collection for the generation of an operational behavior score.

FIG. 5 is a block diagram of data collection to the generation of an operational behavior score. Data is collected from one or more sources 501. The data relates to the operation of a system and the environment in which the system is being operated. The data is organized into an appropriate format that will be enable conversion into line segments 502. The organization process may include, but is not limited to merging different data sources, sorting the data, and conversion into different data storage formats. The data is converted into a series of line segments 503. The line segments may have any data on the X and Y axis so long as they are permit data to be in a format of line data. The data along the horizontal, or X axis, must be sorted in either ascending or descending order. For example, if the X axis variable is the "time of operation", then the data would be sorted in chronological order. Because the data needs to be converted to line segments, each of the X values must be unique. If there are multiple X values occurring in the data then some type of merging must be done such as, but not limited to, taking an average of all the Y values associated with each of the non unique X values. The X values may either be evenly spaced or occur at uneven intervals. The lengths of line segment that occur between adjacent points are calculated using EQUATION 3 504. This equation is general and allows for different parameters and functions. There parameters and functions can be different for each of the different line segments. The line segments are combined using EQUATION 4 in order to describe behavior 505. The combination includes, but is not limited to, simply adding the line segments together to get a line length. In this case, a longer line would indicate higher volatility. The line segments can also be combined into multiple values. One such approach would include, but is not limited to, adding the first half of the points for one value and adding the last half of the points for another value. In addition, EQUATION 4 allows for treating each line segment differently. For example, some of these treatments include but are not limited to, removing some of the line segments, averaging line segments, multiplying by a different value, or rounding the line segments to a nearest value.

Figure 6:
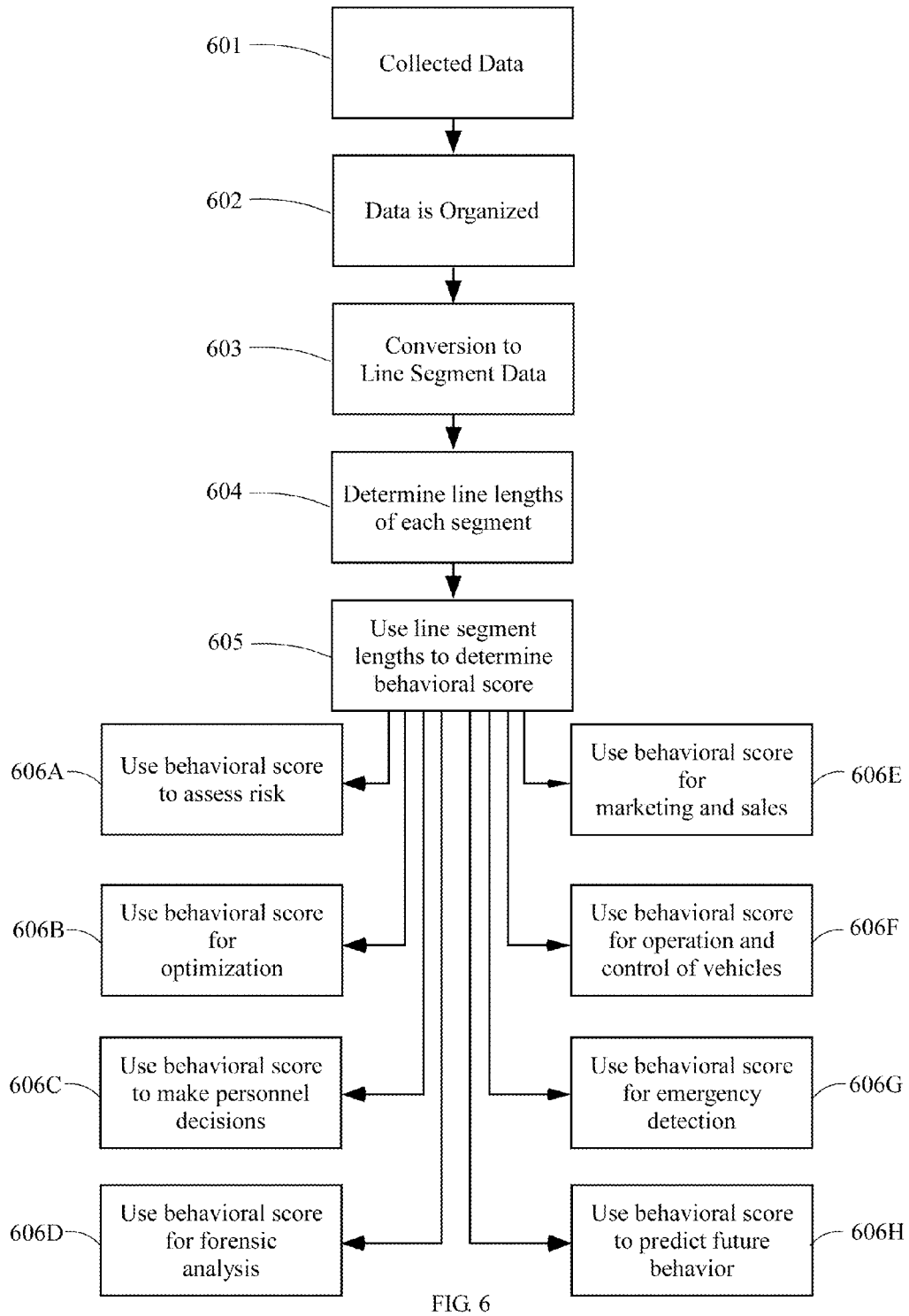
FIG. 6 is a block diagram of data collection for the use of an operational behavior score.

FIG. 6 is a block diagram of data collection to the use of an operational behavior score. Data is collected from one or more sources 601. The data relates to the operation of a system and the environment in which the system is being operated. The data is organized into an appropriate format that will be enable conversion into line segments 602. The organization process may include, but is not limited to merging different data sources, sorting the data, and conversion into different data storage formats. The data is converted into a series of line segments 603. The line segments may have any data on the X and Y axis so long as they are permit data to be in a format of line data. The data along the horizontal, or X axis, must be sorted in either ascending or descending order. For example, if the X axis variable is the "time of operation", then the data would be sorted in chronological order. Because the data needs to be converted to line segments, each of the X values must be unique. If there are multiple X values occurring in the data then some type of merging must be done such as, but not limited to, taking an average of all the Y values associated with each of the non unique X values. The X values may either be evenly spaced or occur at uneven intervals. The lengths of line segment that occur between adjacent points are calculated using EQUATION 3 604. This equation is general and allows for different parameters and functions. There parameters and functions can be different for each of the different line segments. The line segments are combined using EQUATION 4 in order to describe behavior 605. The combination includes, but is not limited to, simply adding the line segments together to get a line length. In this case, a longer line would indicate higher volatility. The line segments can also be combined into multiple values. One such approach would include, but is not limited to, adding the first half of the points for one value and adding the last half of the points for another value. In addition, EQUATION 4 allows for treating each line segment differently. For example, some of these treatments include but are not limited to, removing some of the line segments, averaging line segments, multiplying by a different value, or rounding the line segments to a nearest value. The behavioral score is used to assess risk 606A, for optimization 606B, make personnel decisions 606C, for forensic analysis 606D, for marketing and sales 606E, for operation and control of vehicles 606F, for emergency detection 606G, and, but not limited to, prediction of future behavior 606H.

Figure 7:
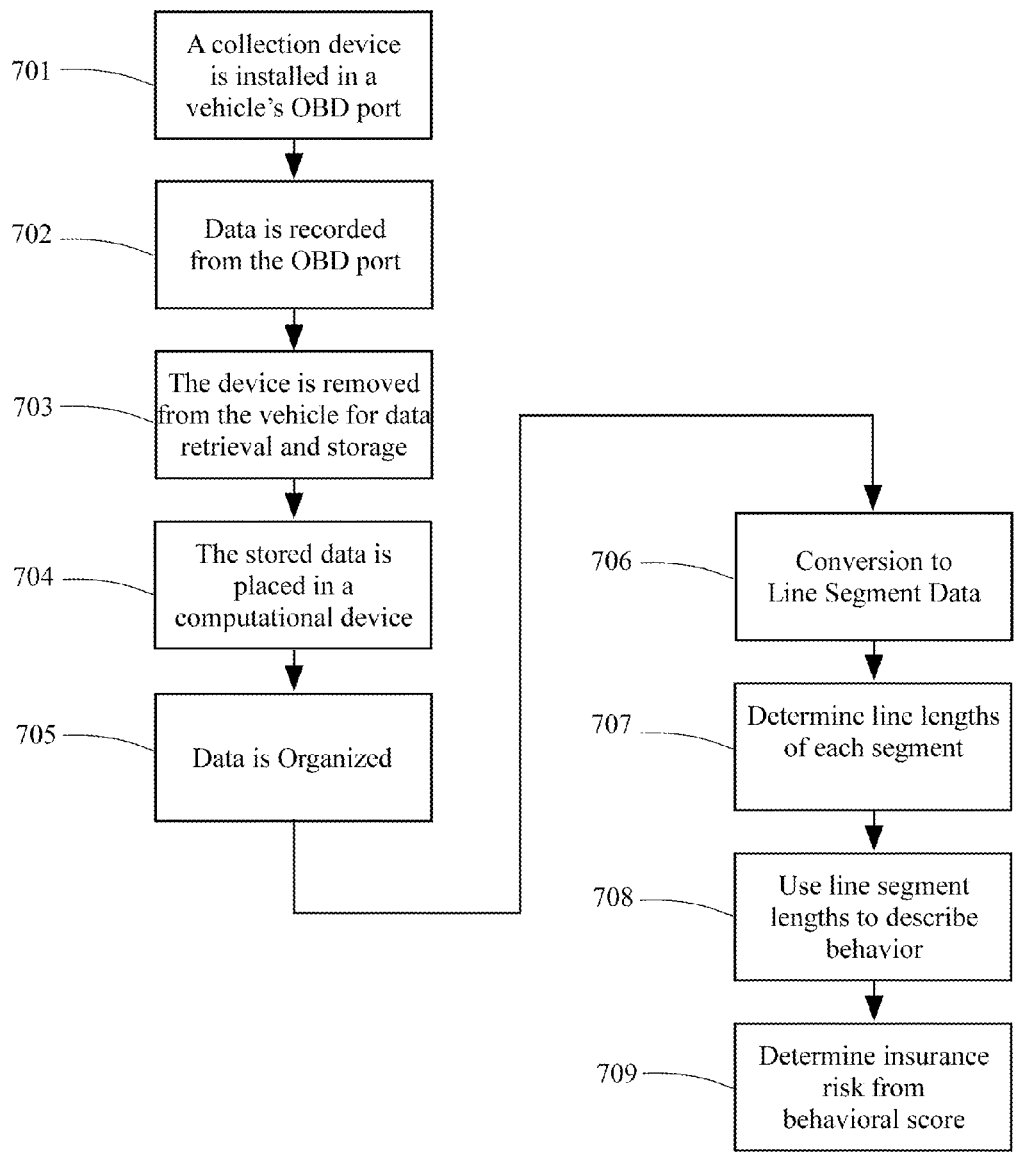
FIG. 7 is a block diagram of one embodiment of data collection for the generation of an operational behavior score.

FIG. 7 is a block diagram of one embodiment of data collection to the generation of an operational behavior score. A person installs a data collection device into a vehicle's OBD port 701. The data collection device records driving data for a specified amount of time 702. The data relates to the operation of a system and the environment in which the system is being operated. The data collection device is removed by the vehicle operator and is sent back to the insurance company for data retrieval and storage 703. Once received by the insurance company, the data stored on the data collection device is placed in a computational device such as a computer for storage until use 704. The stored data is rearranged into a format that the computational device can input into a mathematical algorithm, according to the present invention 705. The data is organized into an appropriate format that will be enable conversion into line segments. The organization process may include, but is not limited to merging different data sources, sorting the data, and conversion into different data storage formats. The data is converted into a series of line segments 706. The line segments may have any data on the X and Y axis so long as they are permit data to be in a format of line data. The data along the horizontal, or X axis, must be sorted in either ascending or descending order. For example, if the X axis variable is the "time of operation", then the data would be sorted in chronological order. Because the data needs to be converted to line segments, each of the X values must be unique. If there are multiple X values occurring in the data then some type of merging must be done such as, but not limited to, taking an average of all the Y values associated with each of the non unique X values. The X values may either be evenly spaced or occur at uneven intervals. The lengths of line segment that occur between adjacent points are calculated using EQUATION 3 707. This equation is general and allows for different parameters and functions. There parameters and functions can be different for each of the different line segments. The line segments are combined using EQUATION 4 in order to describe behavior 708. A computational device, such as a computer, uses mathematical algorithms to compute an operational behavior score from the output of EQUATION 4. The operational behavior score is used by the insurance company to determine any special benefits that the vehicle operator may earn 709, for example lower/higher monthly rates, lower/higher deductibles, good driver discounts, etc.

SUMMARY

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A method for analyzing usage based data to describe driving behavior comprising one or more dimensions from a given system or set of systems, said method comprising the steps of organizing the usage based data into one or more line segments and determining the generalized line length of each segment so as to describe driving behavior, said driving behavior being one or more selected from lateral movement, vertical movement, vertical position, roll, pitch, yaw, and altitude.

2. The method of claim 1 wherein said driving behavior is determined by comparing the data to a target data.

3. The method of claim 1 wherein said driving behavior is quantified as a behavioral score.

4. The method of claim 1 wherein said driving behavior is used to assess risk.

5. The method of claim 1 wherein said driving behavior is used to predict future behavior.

6. A method for analyzing usage based data to describe driving behavior comprising one or more dimensions from a given system or set of systems, said method comprising the steps of organizing the data into one or more line segments and determining the slope of the generalized line length of each segment in order to describe driving behavior, said driving behavior being one or more elected from lateral movement, vertical movement, vertical position, roll, pitch, yaw, and altitude.

7. The method of claim 6 wherein said driving behavior is determined by comparing the data to a target data.

8. The method of claim 6 wherein said driving behavior is quantified as a behavioral score.

9. The method of claim 6 wherein said driving behavior is used to assess risk.

10. The method of claim 6 wherein said driving behavior is used to predict future behavior.

11. A method for analyzing usage based data to describe driving behavior comprising one or more dimensions from a given system or set of systems, said method comprising the steps of organizing the data into one or more line segments and determining the area above or below the generalized line segments in order to describe driving behavior, said driving behavior being one or more selected from lateral movement, vertical movement, vertical position, roll, pitch, yaw, and altitude.

12. The method of claim 11 wherein said driving behavior is determined by using the area between the generalized line segment and the target data.

13. The method of claim 11 wherein said driving behavior is quantified as a behavioral score.

14. The method of claim 11 wherein said driving behavior is used to assess risk.

15. The method of claim 11 wherein said driving behavior is used to predict future behavior.

16. A method for analyzing usage based data to describe driving behavior comprising one or more dimensions from a given system or set of systems, said method comprising the steps of organizing the data into one or more line segments and determining the generalized line length, slope, and area above or below the generalized line segments in combination to be used to describe driving behavior, said driving behavior being one or more selected from lateral movement, vertical movement, vertical position, roll, pitch, yaw, and altitude.

17. The method of claim 16 wherein said driving behavior is determined by using the area between the generalized line segment and the target data.

18. The method of claim 16 wherein said driving behavior is quantified as a behavioral score.

19. The method of claim 16 wherein said driving behavior is used to assess risk.

20. The method of claim 16 wherein said driving behavior is used to predict future behavior.

* * * * *